Figure 1:
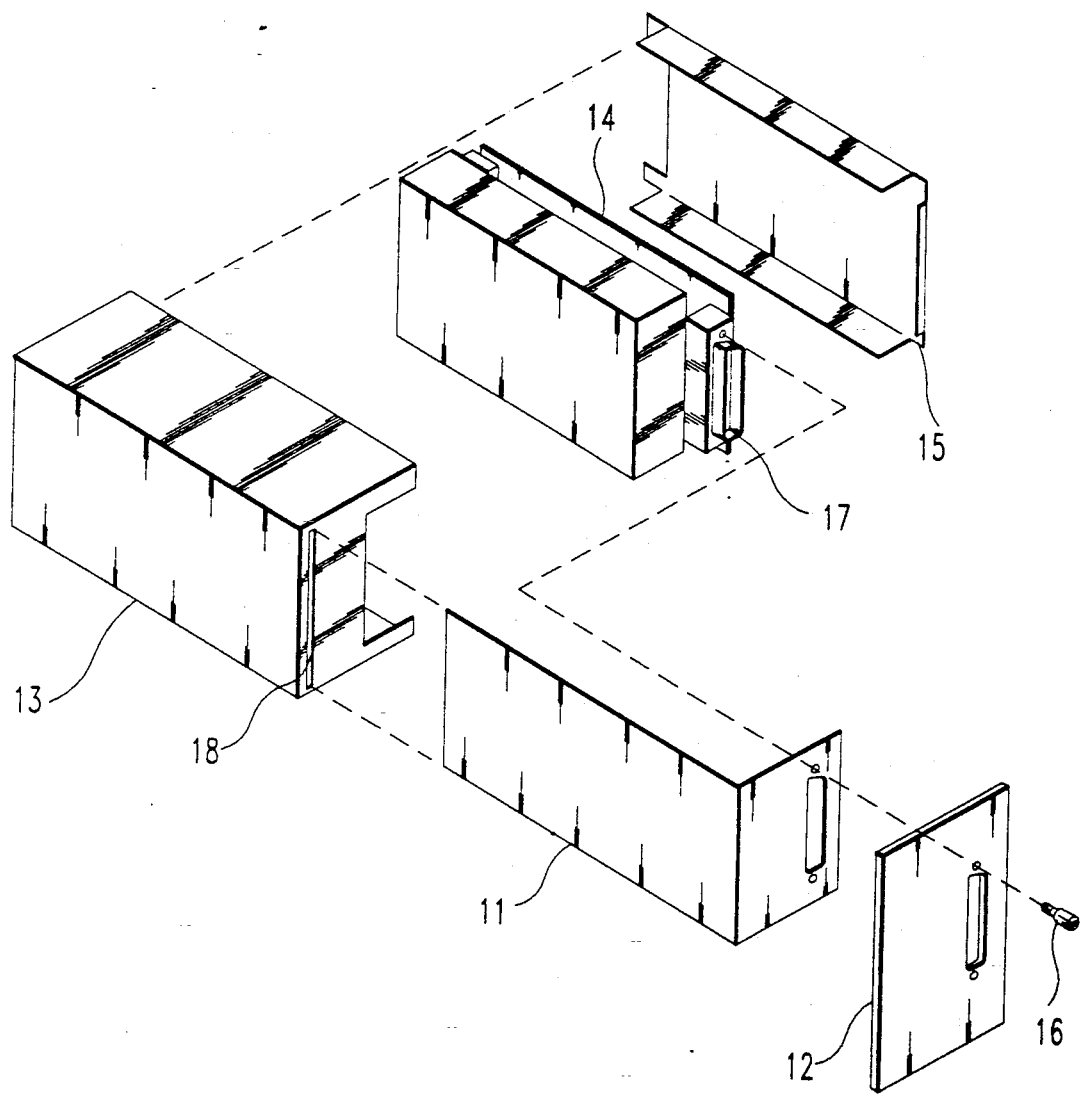

United States Patent [19]
Catala et al.

[11] Patent Number: 5,170,318
[45] Date of Patent: Dec. 8, 1992

[54] FLEXIBLE CAPACITOR

[75] Inventors: Gilles Catala, Vence; Casimir Lasmayoux, La Colle sur Loup; Michel Ferry, Vallauris; Pierre Vachee, La Gaude; Andre Paci, Antibes; Henri Braquet, Aspremont, all of France

[73] Assignee: International Business Machines Corporation, Armonk, N.Y.

[21] Appl. No.: 783,490

[22] Filed: Oct. 28, 1991

[51] Int. Cl.$^5$ ............................................. H01G 4/08
[52] U.S. Cl. .................................................. 361/323
[58] Field of Search ....................... 361/323; 29/25.42

[56] References Cited

U.S. PATENT DOCUMENTS

| | | | |
|---|---|---|---|
| 151,004 | 5/1874 | Browne et al. | 361/311 |
| Re. 156,642 | 7/1923 | Smith et al. | 361/311 |
| 3,649,892 | 3/1972 | Booe | 361/323 |
| 4,202,594 | 5/1980 | Coleman et al. | 339/147 R |
| 4,481,558 | 11/1984 | Endoh et al. | 361/323 X |
| 4,499,520 | 2/1985 | Cichanowski | 29/25.42 X |

FOREIGN PATENT DOCUMENTS 3345942 7/1985 Fed. Rep. of Germany.
3838265 5/1990 Fed. Rep. of Germany.
3079012 4/1991 Japan.

OTHER PUBLICATIONS

T. Izumi, "Metallized Film Capacitors Show Their Mettle" 2209 J. E. E. Journal of Electronic Engineering, No. 237, pp. 72-75, (Sep. 1986).

Primary Examiner—Donald A. Griffin
Attorney, Agent, or Firm—Harold Huberfeld

[57] ABSTRACT

A flexible capacitor (1) includes a dielectric made of flexible material, coated on each side with conductive material for insertion between a cable shield being at the ground potential of a remote electrical machine, and a part on a local machine being at the local ground potential (3, 5, 2) for example at a connector (7) level.

21 Claims, 3 Drawing Sheets

FLEXIBLE CAPACITOR

The present invention relates to capacitors in general, and more specifically to a flexible capacitor, particularly suitable for use in a connection between two electrical machines.

From the case of a connection between a TV receiver and a video cassette player, to the case of connections between the remote frames or terminals of elaborate data processing equipment, there are many instances when electrical machines share a physical communication media over which they exchange information signals.

The media quite often takes the form of a cable, which usually features at both ends a connector to fit in the matching connector implemented in each to-be-connected machine.

Whether it be in an office, industrial or home environment, such a connection between remote electrical machines needs to be radio frequency proof so as to not be perturbed by the inevitable ambient radio waves (such as the ones generated by other surrounding electrical machines), and must not itself radiate frequencies to a level higher than a threshold, usually set by national standards, beyond which other surrounding electrical machines could be perturbed (both phenomena are known under the generic term 'radio frequency interference').

The machines themselves therefore, are usually encased in a metal frame (or a frame coated with electrically conductive material) set at the local ground potential, and the cable itself comprises a bundle of internal electrical wires sheathed by a shield on the total length. It is indeed when the shield is connected at both ends, to a machine part at the ground potential so as to ensure electrical continuity, that the overall connection radiates less and is less susceptible to incident waves. Basically, the magnetic field generated by currents in the internal wires, compensates for the magnetic field generated by the current flowing within the shield in the opposite direction.

Such a compensation however, is fully effective only if the shield and the internal wires are geometrically concentric from one end of the cable to the other, so that mutual coupling is optimized.

On the other hand, the electrical continuity is conflicting with the safety requirements, also set by national standards, that an operator of a first machine, should not be able to touch any part which is at the ground potential of a second remote electrical machine. Chances are indeed very high that the ground potential at the local machine might be dangerously different from the ground potential at the remote machine. Besides, if a short circuit or any other problem occurred in the remote machine, no electrical hazard, transiting thru the shields, should be able to affect the operator at the local machine.

Therefore, the connection between the cable shield and any machine part at the ground potential, should feature a high impedance at the industrial frequencies (DC to a few hundreds Hertz).

In the past, attempts have been made to meet such conflicting requirements by inserting some capacitance between the cable shield and a part at the ground potential on all connected machines. Capacitance there ensures a high impedance at the industrial frequencies, and electrical continuity (low impedance) at the radio frequencies (practically, above 1 MHz).

A well-known technique consists in soldering one or several solid state capacitors on the matching connector of any to-be-connected machine, so as to ensure capacitance between the shield of a plugqed-in connector, and a part (usually the metal frame) of the connected machine, at the local ground potential.

This technique however has the main following drawbacks:
  The soldering of capacitors on a connector is neither technically easy nor inexpensive to implement in a manufacturing line.
  Strain on the connector (plug-in, plug-out) might later affect the quality of the soldering.
  The capacitors are not geometrically concentric with the cable internal wires, so that mutual coupling between the cable shield and wires is degraded ('pig tail' effect), and the overall shielding effect is ruined.

Another technique is taught by U.S. Pat. No. 4,202,594 to Coleman et al. It consists in a washer-like capacitor typically made of a ceramic dielectric inserted in a connector assembly as capacitance between an outer electrical conductor (connected to the cable shield), and the wall of a utilization device (machine part at the ground potential).

Whereas it solves the 'pig tail' effect problem, this technique still has strong drawbacks:
  It requires low tolerance flatness for both the surfaces of the outer electrical conductor and the device wall, otherwise the ceramic might break into pieces (problem amplified when the connector is not round-shaped).
  Strain on the connector is also damageable to the ceramic.
  High quality ceramics coated with conductive material are expensive to produce.

It is therefore an object of the present invention to fully meet electrical requirements regarding radio frequency interference and safety for a connection between two electrical machines, solve the problems still remaining with prior art techniques, and feature even more advantages cited below.

The invention includes a capacitor with a dielectric made of flexible material, coated on each side with conductive material, for insertion, for example at a connector level, between a cable shield being at the ground potential of a remote electrical machine, and a part on a local machine being at the local ground potential.
  Such a capacitor is technically easy and therefore inexpensive to manufacture.
  Mechanical strain does not affect quality of the capacitor.
  The capacitor is geometrically concentric with the cable internal wires.
  Because it is thin and flexible, it can adapt to any kind of already existing connection by bending in any direction.
  It can be manufactured or shaped on site so as to adapt to any desired configuration or capacitance value.

The invention specifically includes a flexible capacitor comprising:
  a flexible dielectric, coated with a conductive material on both sides via the use of adhesive, the conductive material forming a first and a second electrode, a first opening in the flexible dielectric and the first electrode, of a first shape so as to allow the mechanical traversing of the capacitor plan by a protruding part of a connector, and a second opening in the second electrode, aligned with the first opening, of a second shape slightly larger than, but encompassing the first shape.

The invention will be better understood from the following detailed description read in conjunction with the following schematics:

FIG. 1 showing an electrical machine assembly in which the invention is embodied.

Figure 2:
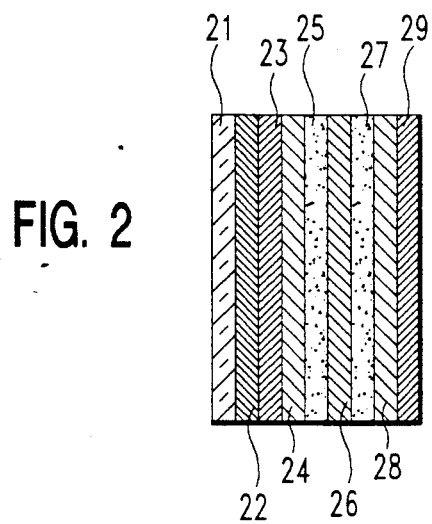

FIG. 2 showing a cross-sectional view of a capacitor according to the invention.

Figure 3:
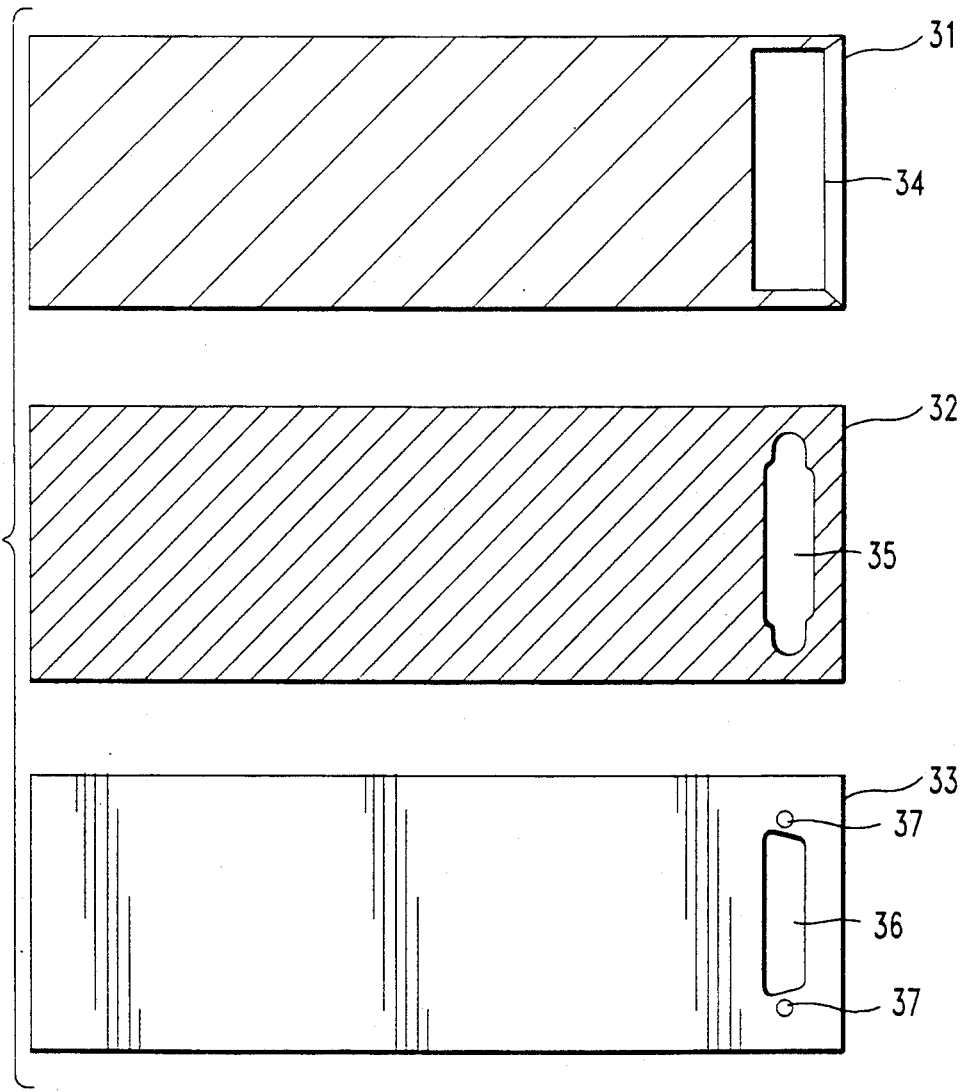

FIG. 3 showing a view of the various masks involved in the manufacturing of a capacitor according to the invention.

Figure 4A:
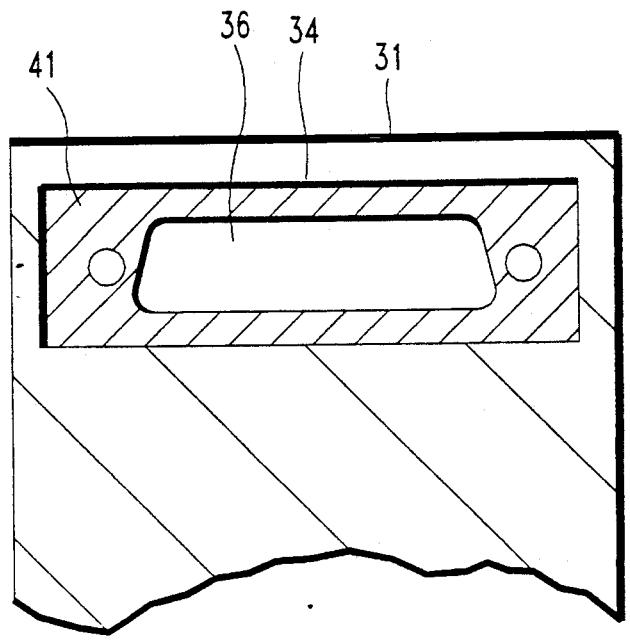
Figure 4B:
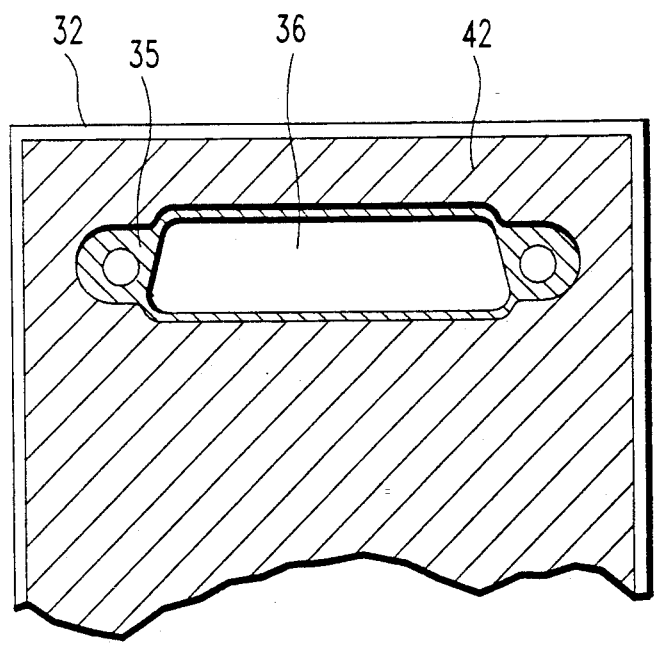

FIGS. 4A and 4B showing a detailed view of the back and the front sides of a capacitor according to the invention.

FIG. 1 shows an electrical machine assembly in which the invention is embodied. A capacitor 11 comprises two portions bent at 90°: a front portion and a side portion. The front portion is inserted between a front panel 12, and a block composed of a box 13, a cover 15 and a printed circuit 14 on which are mounted electronic circuitry and a connector 17. The front portion includes a front electrode (facing towards item 12), and a back electrode (facing towards the connector). The side portion of the capacitor is inserted in a slot 18 cut in box 13. Screws 16 enable the connector to be mechanically attached against the front panel. The reset of the assembly is tied together by means that are not described here, but are well known to one skilled in the art (screws, clicks, etc. . . ).

The front panel 12 is made of plastic coated with conductive material on its back side, except around the openings provided for the connector and the screws.

The box 13 and the cover 15 are made of conductive metal.

Other combinations of conductive/non conductive materials could be easily chosen by one skilled in the art providing:

No part of the printed circuit or the connector, including the screws, should be in electrical contact with any of the items 13, 15 or 12.

Portion of the connector facing the front portion of the capacitor should be in electrical contact with the back electrode of that capacitor (a conductive gasket, not shown on the figure, could be placed between the connector and the back electrode, to improve electrical contact).

Items 12, 13 and 15 should be in electrical contact together with the front electrode of the capacitor, and the local ground potential (a conductive gasket could also be inserted between the front electrode and the front panel).

When a matching connector, terminating a shielded cable coming from a remote electrical machine, is plugged into connector 17, the cable shield is connected to the back electrode of the capacitor thru the contact between the two matching connectors. Thus, capacitance is introduced between parts at the local ground potential (12, 13, 15, front electrode of 11), and parts at the remote ground potential (cable shield, front of 17, back electrode of 11).

It will be obvious to one skilled in the art that the embodiment of capacitor 11 in the assembly as shown FIG. 1, is given as an example, and that many other types of embodiments involving panels, boxes, covers and connectors of different shape, size and way of assembling, are possible.

FIG. 2 shows a cross-sectional view of capacitor 11; it should be noticed that the represented thickness for the layers is out of scale.

The capacitor includes a layer 26 of polyester which is preferably about 23 $\mu$m thick, to serve as the dielectric, and two layers 24 and 28 of copper (a few dozen microns thick) to serve as the electrodes. Adhesive (polyester resin) material, preferably about 12 $\mu$m thick (layers 25 and 27), is used to stick the copper and the polyester together.

It will be obvious to one skilled in the art, that a capacitor is at this point already provided; other materials (such as nickel, etc. . . ) of other thicknesses could have also been used for the electrodes, or for the dielectric (polyimide, . . . ) or the adhesive, providing they are flexible enough materials to not break when bent or folded.

Improvements to such a capacitor can be achieved by coating the copper with a layer of tin (or any anti-oxidation material compatible with copper) on each side (layers 23 and 29) preferably about 2 $\mu$m thick, so as to avoid oxidation, or by coating one or the two electrodes (only one electrode shown on FIG. 2) with an insulating cover (plastic film) 21 so as to prevent electrical contact between one or the two electrodes, with a machine part not being at the same potential. Such a cover is preferably about 50 $\mu$m thick and is for example adhered to the next layer by an adhesive layer 22.

The assembly 21, 22, 23, 24 and 25 forms the l,ack electrode of capacitor 11 (facing towards connector 17), while assembly 27, 28 and 29 forms the front electrode.

FIG. 3 shows a view of the various masks involved in the manufacturing of capacitor 11; such a representation however is not intended to follow the order of manufacturing steps (see below).

Mask 33 applies for all layers of the capacitor but layers 21 and 28. It features three openings: one opening 36 for allowing a protruding part of the connector to traverse thru the capacitor plan, and two small openings 37 to allow screws to pass therethrough (see also FIG. 1). Note that other connector types might not require screws and the corresponding openings.

Mask 32 applies for layer 28 (copper on the front electrode). The shape for opening 35 there is larger by about 1 mm and encompassing the outer limits of shape 36, if the two shapes were superposed.

Mask 31 applies for layer 21 (cover). An opening 34 features a rectangular shape encompassing both the shapes for openings 35 and 36.

It will be obvious to one skilled in the art that the overall rectangular shape for the capacitor as shown in FIG. 3, could be easily modified to any other shape so as to adapt to any given electrical machine hardware configuration. It will be equally obvious, that the capacitance value being dependent upon the electrode areas facing each other, the capacitor value could be adjusted to any desired value, at manufacturing time, or even after, by simply cutting off portions of an over-sized capacitor. In the same manner, openings can be adapted to any kind of connector type and shape.

Capacitance values of 4 nF to 20 nF were easily reached with the invention. Corresponding impedance between local and remote ground potentials was measured above 190 kohms at the industrial frequency of 50

Hz, around 1 ohm for frequencies above 10 MHz, and around 0.3 ohm for frequencies above 30 MHz.

Manufacturing of such a capacitor involves well-known techniques of lamination, pressing, chemical etching, etc. . .

FIG. 4A shows a detailed view of the back and FIG. 4B shows a detailed view of the electrodes of capacitor 11.

Area 41 defines the portion of the back electrode meant for mechanical and electrical contact with the portion of connector 17 facing the capacitor plan, and being at the remote ground potential. It is the area comprised between openings 34 (opening in the cover) and 36 (smallest opening for all layers for letting protruding part of connector 17 thru the capacitor plan).

Area 42 defines the portion of the front electrode available for mechanical and electrical contact with a part at the local ground potential. It is to be noticed that outer limits (32) of that area, can be designed to stay within about 1 mm of the outer limit 31. This can be done to avoid lightning effect between the two electrodes, when high voltage differences (500 V and above) are expected between the local and remote ground potentials.

It is also to be noticed that in order to minimize electrical contact inductance, the smallest measured dimension in both areas 41 and 42 must be kept at an acceptable level: i.e. the minimum distance between outer limits of 36 and outer limits of 34, as well as the minimum distance between outer limits of 35 and outer limits of 32.

What is claimed is:

1. A flexible capacitor comprising:
   flexible dielectric means (26), coated with conductive material means (24, 28) on both sides via the use of adhesive means (25, 27), the conductive material means forming a first and a second electrode,
   a first opening (36) in the flexible dielectric means and the first electrode, of a first shape so as to allow the mechanical traversing of the capacitor by a protruding part of a connector (17), and
   a second opening (35) in the second electrode, aligned with the first opening, of a second shape slightly larger than, but encompassing the first shape.

2. A capacitor according to claim 1, further comprising anti-oxidation means (23, 29) for at least one electrode coating the conductive material means.

3. A capacitor according to claim 1 wherein at least one electrode is partly covered with insulating material means (21), via the use of adhesive means (22).

4. A capacitor according to claim 1 wherein the first electrode is in first mechanical and electrical contact with a part of the connector at a first ground potential, and the second electrode is in second mechanical and electrical contact with a part of a frame (12, 18, 15) at a second ground potential, said frame being mechanically bound to the connector.

5. A capacitor according to claim 4, wherein at least one mechanical and electrical contact is improved by the use of a conductive gasket.

6. A capacitor according to claim 4 wherein the first and second mechanical and electrical contacts define a geometrically plane shape, surrounding and concentric with the protruding part of the connector.

7. An assembly comprising:
   a first connector (17) having a first protruding part of conductive material,
   a panel (12) of an electrical machine being of conductive material at least in its inner surface, and having an opening so as to allow the mechanical traversing of the panel plan by the first protruding part,
   a matching connector adapted to be plugged-in to the first connector, having a second protruding part of conductive material to be in mechanical and electrical contact with the first protruding part,
   flexible dielectric means (26), coated with conductive material means (24, 28) on both sides via the use of adhesive means (25, 27), the conductive material means forming a first and a second electrode,
   a first opening (36) in the flexible dielectric means and the first electrode, of a first shape so as to allow the mechanical traversing of the capacitor plan by a protruding part of a connector (17), and
   a second opening (35) in the second electrode, aligned with the first opening, of
   a second shape slightly larger than, but encompassing the first shape.

8. A capacitor according to claim 7, further comprising anti-oxidation means (23, 29) for at least one electrode counting the conductive material means.

9. A capacitor according to claim 7 wherein at least one electrode is partly covered with insulating material means (21), via the use of adhesive means (22).

10. A capacitor according to claim 7, wherein the first electrode is in first mechanical and electrical contact with a part of the connector at a first ground potential, and the second electrode is in second mechanical and electrical contact with a part of a frame (12, 18, 15) at a second ground potential, said frame being mechanically bound to the connector.

11. A capacitor according to claim 10, wherein at least one mechanical and electrical contact is improved by the use of a conductive gasket.

12. A capacitor according to claim 10, wherein the first and second mechanical and electrical contacts define a geometrically plane shape, surrounding and concentric with the protruding part of the connector.

13. A flexible capacitor comprising:
    a flexible layer of dielectric material having thin coatings of adhesive on both sides thereof;
    first and second electrodes each positioned on opposite sides of said flexible dielectric layer and adhered thereto by said adhesive, each of said electrodes being formed of a thin layer of conductive material
    a first opening in the flexible dielectric layer and the first electrode, having a first shape adapted to permit the mechanical traversing of the capacitor by a protruding portion of an electrical connector; and
    a second opening in the second electrode, aligned with the first opening and having a second shape slightly larger than and encompassing the first shape.

14. A capacitor according to claim 13 wherein said flexible dielectric layer is made of polyester less than 30 $\mu$m thick.

15. A capacitor according to claim 13 wherein said first and second electrodes are made of copper layers less than 50 microns thick.

16. A capacitor according to claim 13 wherein said thin coatings of adhesive include a polyester resin less than 15 $\mu$m thick.

17. A capacitor according to claim 13 further including an anti-oxidation coating on at least one of said electrodes.

18. A capacitor according to claim 13 further including a layer of electrical insulation partly covering and adhered to at least one of said electrodes.

19. A capacitor according to claim 13, wherein the first electrode is in first mechanical and electrical contact with a part of the connector at a first ground potential, and the second electrode is in second mechanical and electrical contact with a part of a frame at a second ground potential, aid frame being mechanically bound to the connector.

20. A capacitor according to claim 19, wherein at least one mechanical and electrical contact is improved by the use of a conductive gasket.

21. A capacitor according to claim 19, wherein the first and second mechanical and electrical contacts define a geometrically plane shape, surrounding and concentric with the protruding part of the connector.

* * * * *